United States Patent
Wurmfeld et al.

(10) Patent No.: US 10,960,684 B1
(45) Date of Patent: Mar. 30, 2021

(54) SCHEMES TO VALIDATE AND PROTECT SECURE DOCUMENTS

(71) Applicant: Capital One Services, LLC, McLean, VA (US)

(72) Inventors: David Wurmfeld, Falls Church, VA (US); Steve Faletti, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/683,462

(22) Filed: Nov. 14, 2019

(51) Int. Cl.
| | |
|---|---|
| *B41J 3/28* | (2006.01) |
| *B41M 3/14* | (2006.01) |
| *G06Q 20/04* | (2012.01) |
| *B42D 25/29* | (2014.01) |
| *B42D 25/30* | (2014.01) |

(52) U.S. Cl.
CPC .............. *B41J 3/283* (2013.01); *B41M 3/14* (2013.01); *B42D 25/29* (2014.10); *B42D 25/30* (2014.10); *G06Q 20/042* (2013.01)

(58) Field of Classification Search
CPC . B41J 3/283; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/01; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 3/4078; B41J 11/06; B42D 25/30; B42D 25/29; B41M 3/14; G06Q 20/042; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/107; D06P 1/0032; D06P 1/0096; D06P 5/001; D06P 5/02; D06P 5/2011; D06P 5/2077; D06P 5/2083; D06P 5/30; Y10T 428/24802

See application file for complete search history.

(56) References Cited

U.S. PATENT DOCUMENTS

| | | |
|---|---|---|
| 7,980,463 B2 | 7/2011 | Epstein |
| 8,504,476 B2 | 8/2013 | Richards |
| (Continued) | | |

OTHER PUBLICATIONS

Wicks et al., "Glass microspheres hollow out a niche for anti-counterfeiting strategies," American Ceramic Society Bulletin, vol. 95, No. 6, Aug. 2016, pp. 24-29.

*Primary Examiner* — Manish S Shah
(74) *Attorney, Agent, or Firm* — Banner & Witcoff, Ltd.

(57) ABSTRACT

Aspects described herein may provide detection of a feature of an authorization code image (ACI) incorporated onto a document, thereby allowing for validation of the document. According to some aspects, these and other benefits may be achieved by an instance of a variable protocol that may specify how to generate the ACI to have a particular feature as well as how to detect the particular feature of the ACI. A recipient of the document incorporating the ACI may detect the particular feature of the ACI. If the detected feature matches an expected feature, then the ACI and the document may be determined to be authentic.

18 Claims, 6 Drawing Sheets

(56) References Cited

U.S. PATENT DOCUMENTS

| | | | |
|---|---|---|---|
| 2006/0282383 A1 | 12/2006 | Doran | |
| 2010/0006643 A1* | 1/2010 | Epstein | G06Q 20/1085 235/379 |
| 2012/0321783 A1* | 12/2012 | Hampden-Smith | C09D 7/70 427/162 |
| 2013/0066777 A1* | 3/2013 | Richards | G06Q 40/02 705/42 |
| 2015/0213421 A1* | 7/2015 | Block | G06Q 20/1085 705/43 |
| 2016/0227066 A1* | 8/2016 | Shimazaki | G06K 9/00449 |
| 2016/0255243 A1* | 9/2016 | Omori | H04N 1/4413 358/1.14 |

* cited by examiner

US 10,960,684 B1

SCHEMES TO VALIDATE AND PROTECT SECURE DOCUMENTS

FIELD OF USE

Aspects of the disclosure relate generally to validation of a document. More specifically, aspects of the disclosure may provide improved techniques for validating a document based on an authorization code image (ACI) incorporated onto the document at a time of issuance of the document.

BACKGROUND

Many documents, such as financial instruments or legal documents, require validation. Many conventional techniques for validating a document require a specialized paper stock. The specialized paper stock typical includes a pre-printed image (e.g., a watermark) indicating that a document prepared using the specialized paper stock is valid. Using a static, pre-printed image for validation, however, often fails to deter sophisticated forgers. For example, a forger may become aware of the pre-printed image on the specialized paper stock used to prepare a cashier's check at a particular bank. The forger may copy the printed-image and generate a fraudulent cashier's check to present for cashing or deposit. After the forgery is detected, large quantities of high cost specialized paper stock is wasted as no longer useable, due to the compromised pre-printed image used for validation.

Aspects described herein may address these and other problems, and generally improve the reliability of validating a document in a more accurate and reliable manner with reduced risk of forgery.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may provide for validation of a document by validating an authorization code image (ACI) incorporated onto the document. Aspects described herein may provide for the ACI to be generated and incorporated onto the document at a time of issuance of the document (e.g., contemporaneously as opposed to being predetermined). Aspects described herein may provide for a feature of the ACI to be varied based on any number of factors. Aspects described herein may provide for the detection of the varied feature of the ACI by a recipient of a document incorporating the ACI. By varying features of the ACI, a risk of forgery is reduced.

More particularly, some aspects described herein may provide a computer-implemented method for validating a document such as, for example, a cashier's check. The method may include receiving a request for a cashier's check. An ACI for the cashier's check may be determined based on an instance of a variable protocol for generating ACIs. The determined ACI may be printed on the cashier's check. Information based on the variable protocol may be provided to a recipient of the cashier's check (e.g., a depositing bank). The provided information may be used to detect a variable property or feature of the ACI and/or to validate the cashier's check.

Corresponding apparatuses, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for determining an authenticity of a document. A document may be requested by a requester. Based on the request, an issuer of the document may generate an authorization code image (ACI). The ACI may be generated based on information related to the requester of the document and/or information provided by the document. The ACI may be incorporated onto the document. The issuer of the document may impart a property or feature to the ACI that may be varied over time and/or may be unique to the document. A recipient of the document may develop the ACI to detect the imparted property or feature of the ACI. If the detected property or feature matches an expected property or feature of the ACI, then the ACI and therefore the document may be considered to be valid. If the detected property or feature does not match an expected property or feature of the ACI, then the ACI and therefore the document may be considered to be invalid. The ACI may vary in any manner—for example, by shape size, design, placement, etc.—based on any input—for example, a time of day, a requestor, a location, a recipient, etc. The ACI may be adjusted and/or varied at any time along with a corresponding manner or technique for detecting a change or adjustment to any property or feature of the ACI, thereby reducing opportunities to copy or forge the ACI. Accordingly, documents incorporating the ACI may be determined to be valid in a more secure and reliable manner.

Before discussing these concepts in greater detail, however, several examples of a computing device that may be used in implementing and/or otherwise providing various aspects of the disclosure will first be discussed with respect to FIG. 1.

Figure 1:
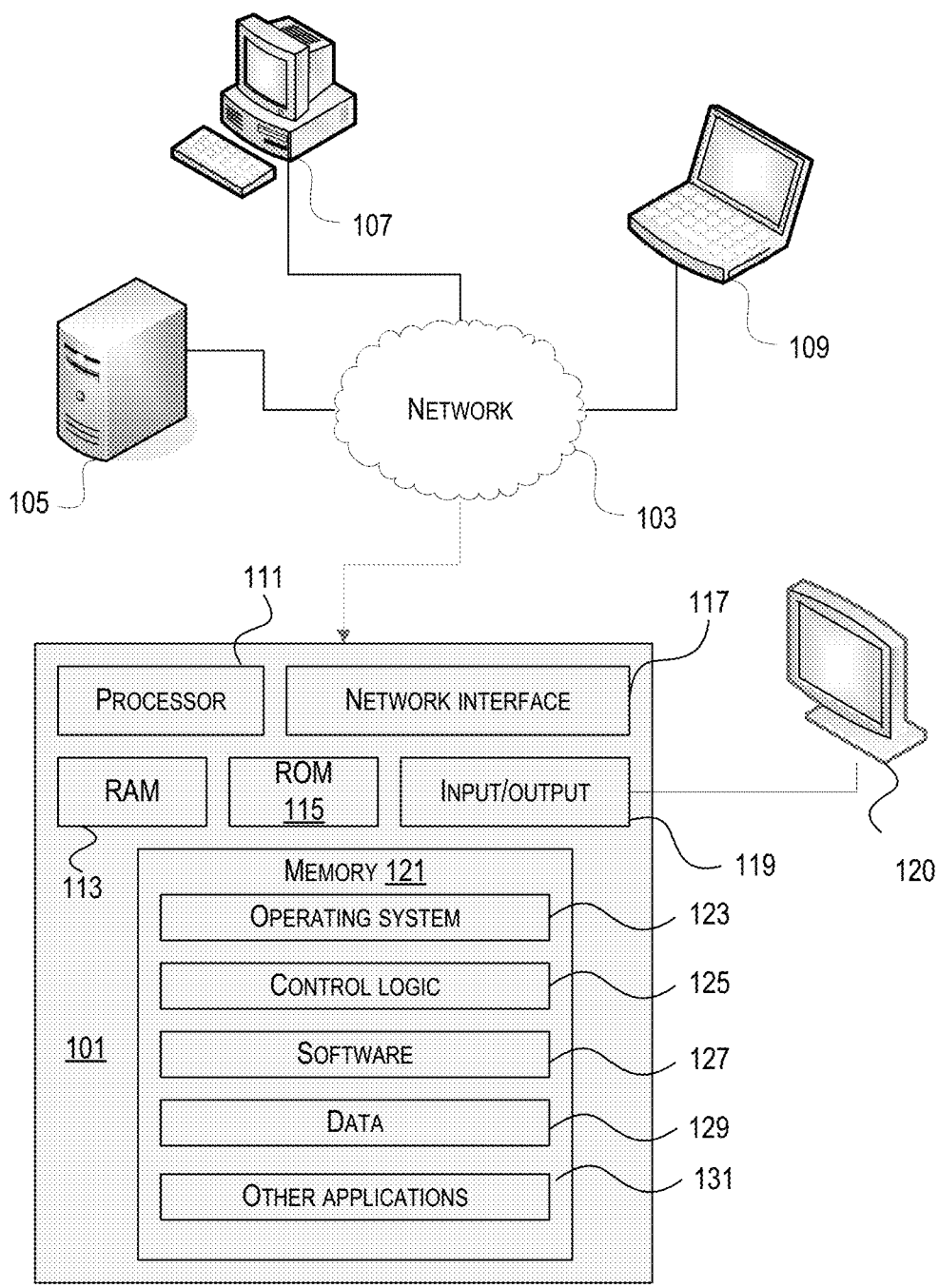
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, local area networks (LANs), wireless networks, personal networks (PAN), and the like. Network 103 is for illustration purposes and may be replaced with fewer or additional computer networks. A LAN may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves, or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, software 127 (e.g., machine learning software), data 129 (e.g., training set), and other applications 131. Control logic 125 may be incorporated in and may be a part of software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to an example arrangement for protecting and/or validating an authenticity of a document.

Figure 2:
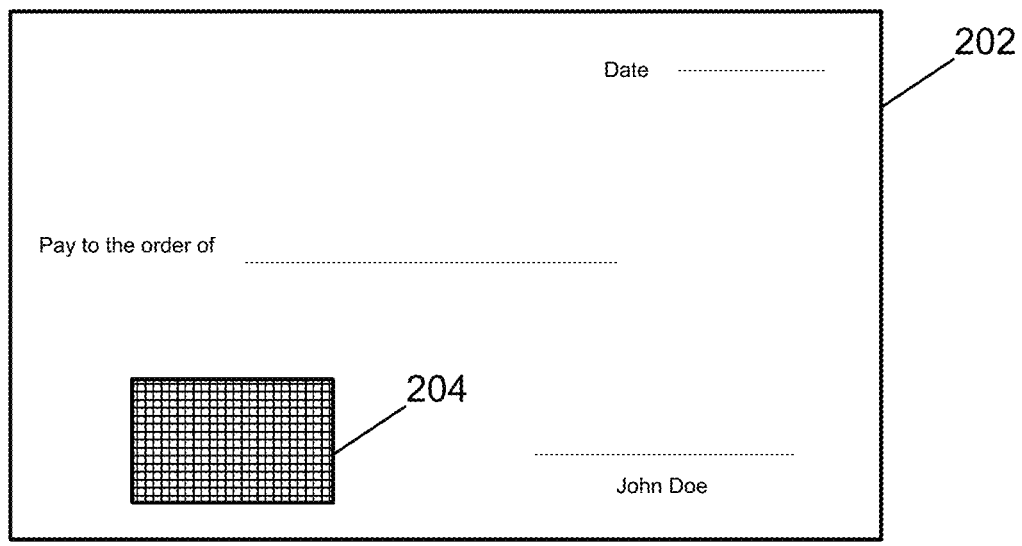
FIG. 2 depicts an authorization code image (ACI) incorporated onto a document according to one or more aspects of the disclosure.

FIG. 2 illustrates an example arrangement for protecting a document 202 in accordance with one or more aspects described herein. The document 202 may be any type of document such as, for example, a financial instrument or a legal document. In various embodiments, the document 202 may be a cashier's check or a certified check. The document 202 may include an authorization code image (ACI) 204. The ACI 204 may be any type of image. The ACI 204 may be, for example, any graphical image, any textual image, or any combination thereof. The ACI 204 may be used for validating, verifying, and/or authenticating the document 202. The document 202 may be considered to be a secure document when associated with the ACI 204.

In various embodiments, an issuer (e.g., an issuing bank of a payor of a cashier's check) of the document 202 may generate and/or may place the ACI 204 on the document 204. In various embodiments, the ACI 204 may be printed on the document 202. In various embodiments, a recipient (e.g., a cashing or depositing bank of a payee of the cashier's check) of the document 202 may use the ACI 204 to confirm an authenticity and/or validity of the document 202 as described herein. That is, the recipient of the document 202 may determine the document 202 is authentic and/or valid by confirming the validity of the ACI 204.

In various embodiments, the ACI 204 may be a visible image. In various embodiments, the ACI 204 may not be visible. In various embodiments, the ACI 204 may not be visible initially (e.g., when placed onto the document 202) and may become visible based on a process for developing the ACI 204 as described herein. In various embodiments, the ACI 204 may be a two-dimensional matrix such as, for example, a barcode or a quick response (QR) code. In various embodiments, the ACI 204 may be a watermark. In various embodiments, the ACI 204 may be machine-readable. In general, the ACI 204 may have any shape, size, design, and arrangement.

In various embodiments, the ACI 204 may be placed on the document 202 based on issuance of the document 202 as opposed to, for example, pre-printing or pre-placing the ACI 204 on the document 204. The ACI 204 may be generated based on a variable protocol that may vary any property of the ACI 204. In various embodiments, the ACI 204 may be varied by design—for example, a shape and/or a size of the ACI 204. In various embodiments, the ACI 204 may be varied by a placement on the document 202. As an example, in a first instance of the variable protocol, the ACI 204 may be placed or positioned in proximity to an upper right corner of the document 202 while in a second instance of the variable protocol the ACI 204 may be placed or positioned in proximity to a lower left corner of the document 202. As an additional example, in a first instance of the variable protocol, the ACI 204 may be a first two-dimensional matrix comprising first encoded information while in a second instance of the variable protocol the ACI 204 may be a second, different two-dimensional matrix comprising second encoded information.

Other properties and/or features of the ACI 204 may also be varied. In various embodiments, an ink and/or a property of an ink used to print the ACI 204 may be varied to adjust a property or feature of the ACI 204. In various embodiments, a concentration of an additive of an ink for printing the ACI 204 may be varied or adjusted. In various embodiments, a concentration of microspheres of an ink for printing the ACI 204 may be varied or adjusted. In various embodiments, a property of an ink for printing the ACI 204 may be varied or adjusted to affect a response of the ink to a predetermined wavelength of light. In various embodiments, a property of an ink for printing the ACI 204 may be varied or adjusted to affect a response of the ink to a change in temperature. In various embodiments, a property of an ink for printing the ACI 204 may be varied or adjusted to affect a response of the ink to a human touch. In various embodiments, any adjustment to a property of an ink used to print the ACI 204 may be detected by a recipient of the document 202 to verify an authenticity of the ACI 204 (and therefore the document 202) as described herein.

In various embodiments, the ACI 204 may comprise encoded information. As an example, the ACI 204 may be generated based on encoding information such as, for example, information related to the ACI 204 and/or the document 202. As a further example, the ACI 204 may be generated based on a hash of information such as, for example, information related to the ACI 204 and/or the document 202. In various embodiments, any encoded information of the ACI 204 may be decoded by a recipient of the document 202 to verify an authenticity of the ACI 204 (and therefore the document 202) as described herein.

One or more properties or features of the ACI 204 (e.g., a design of the ACI 204 and/or a placement of the ACI 204) may be varied based on any factor. In various embodiments, a property or feature of the ACI 204 may be varied based on a date of issuance of the document 202, a time (e.g., a time of day) of issuance of the document 202, a customer associated with the document 202 (e.g., a payor of a cashier's check), a location of issuance of the document 202, and/or a recipient of the document 202 (e.g., a payee of a cashier's check). In various embodiments, a property or feature of the ACI 204 may be changed or adjusted at any time—for example, daily, hourly, or weekly. In various embodiments, the same ACI 204 may be placed on various documents or the ACI 204 may vary for each document (e.g., unique to each document). In various embodiments, the same ACI 204 may be used for a group of documents (e.g., all documents prepared on a certain day or prepared by a particular issuer of the document).

In various embodiments, an issuer of the document 202 may generate the ACI 204 and/or place the ACI 204 on the document 202 based on an instance of the variable protocol that may be used to specify or determine one or more properties or features of the ACI 204. In various embodiments, the ACI 204 may be "developed" (e.g., similar to how film is developed) to reveal a property or feature (e.g., a detectable property or feature). As an example, the ACI 204 may not be visible when initially placed on the document. The issuer of the document 202 may share a technique for developing the ACI 204 with a recipient of the document 202 so that the recipient may verify an authenticity or validity of the document 202. For example, the issuer of the document 202 may provide the recipient with a manner for converting the invisible ACI 24 into a visible ACI 204. The recipient may use such information to develop the ACI 204 (e.g., to make the ACI 204 visible). The ACI 204, and therefore the document 202, may be determined to be authentic based on a feature of the visible ACI 204 and/or the process used to reveal the ACI 204.

Various manners and/or techniques for developing the ACI 204 may be used and/or provided including specifying how the ACI 204 (or an ink used to print the ACI 204) may change in response to a change in temperature, in response to being touched, or in response to exposure to a predetermined wavelength of light. In various embodiments, the recipient of the document 202 (e.g., an entity that may attempt to validate or authenticate the document 202) may be aware of any protocol or technique for developing the ACI 204.

Overall, the ACI 204 may be evaluated for authenticity by the recipient of the document 202 in a number of manners based on the instance of the variable protocol that specified generation of the ACI 204. In various embodiments, the recipient may confirm an expected placement, design, shape, or size of the ACI 204. The recipient may also confirm any expected physical property or feature of the ACI 204 such as, for example, the response of the ACI 204 to exposure to certain wavelengths of light or the response of the ACI 204 to changes in temperature. Other expected features may be evaluated such as decoding of any encrypted information contained in the ACI 204 to verify the decoded information matches expected information.

In various embodiments, evaluating any property or feature of the ACI 204 (e.g., converting an invisible ACI 204 to a visible ACI 204 or testing a property of a ink used to print the ACI 204) may be considered developing the ACI 204. In general, any property or feature of the ACI 204 resulting from a particular instance of the variable protocol used to generate the ACI 204 may be used to verify the authenticity of the ACI 204, for example, by a recipient of the document 202 detecting the property or feature imparted to the ACI 204. The instance of the variable protocol used to generate the ACI 204 may specify a manner for detecting any imparted property or feature as well as how to impart the property or feature to the ACI 204.

In various embodiments, a developed ACI 204 and/or information related thereto may be provided to the issuer of the document 202 to verify a correctness or authenticity of the developed ACI 204. As an example, the ACI 204 may comprise an encoded two-dimensional matrix that is developed by decoding the encoded two-dimensional matrix. The decoded two-dimensional matrix may comprise an image or information that may be provided to the issuer of the document 202. The issuer may be able to verify an accuracy or authenticity of the ACI 204 (and therefore the document 202) based on the provided image or information extracted from the developed ACI 204.

In various embodiments, if a property or feature of the ACI 204 (e.g., when developed) differs from an expected property or feature, then the ACI 204 (and therefore the document 202) may be determined to be invalid and/or inauthentic. In various embodiments, a recipient of the document may perform a comparison of an expected property or feature of the ACI 204 to an actual property or feature of the ACI 204. In various embodiment, the issuer of the document 202 may perform such comparison. In various embodiments, the issuer of the document 202 may share a technique for developing the ACI 204 and/or may inform the recipient of the document 202 an expected property or feature of the developed ACI 204.

As an example, the ACI 204 may be printed using an ink that includes microspheres. A concentration of the microspheres may be varied to generate the ACI 204. The microspheres may include an additive (e.g., a material or chemical contained within the microspheres). The additive may cause the ink used to print the ACI to exhibit a first characteristic in a first state—for example, when exposed to ambient light. The additive may cause the ink used to print the ACI to exhibit a second characteristic in a second state—for example, when exposed to a light of a particular wavelength (e.g., predetermined wavelength). In various embodiments, the first and second characteristics may be varied based on the microspheres included in the ink. In various embodiments, the first and second characteristics may be adjusted or changed over time and/or may be determined at a time of issuing the document 202 that is to include the ACI 204. In this manner, the ACI 204 may be changed as desired to reduce a risk of duplication.

In various embodiments, the first characteristic may be that the ACI 204 is not visible in typical lighting situations (e.g., the ACI may be a latent image). The second characteristic may be that the ACI 204 becomes visible when exposed to the light of the predetermined wavelength. The light of the predetermined wavelength may be considered to be a franking light. Printing the ACI 204 using the ink that includes the microspheres may be considered to be a form of franking the document 202, for example, by indicating the document is authentic. In various embodiments, the ACI 204 may convert from an initial textual display of "VOID" to a textual display of "VALID" by exposing the ACI 204 to the franking light. The microspheres (e.g., a concentration and included components thereof) may be adjusted to invoke a particular response to exposure to the franking light. The franking light (e.g., the predetermined wavelength of light provided by the franking light) can also be adjusted as part of the ACI protocol described herein. For example, a light of a first predetermined wavelength may invoke a first response by the ACI 204 while a light of a second predetermined wavelength may invoke a second response by the ACI 204. An issuer of the ACI 204 may specify which wavelength of light to expose to the ACI 204 as part of the development of the ACI 204.

In various embodiments, the ACI 204 may be used in the context of verifying an authenticity of a cashier's check. As an example, a request may be received from an individual or a customer for a cashier's check. The individual or customer may be a payor of the requested cashier's check. A bank may receive the request for the cashier's check. The customer may have an account with the bank that received the request. The request for cashier's check may include information regarding an amount of the cashier's check and/or a payee of the cashier's check.

The bank that receives the request for the cashier's check may determine the ACI 204. The ACI 204 may be generated based on information regarding the customer and/or information associated with the cashier's check (e.g., information associated with a location of the bank, a time of issuance, a date of issuance, a designated payee, etc.). The bank may also determine a placement of the ACI 204 on the cashier's check.

After determining the ACI 204 (e.g., a design, shape, size, encoding, etc.) and the placement of the ACI 204, the bank may determine a property to be adjusted of a ink for printing the ACI 204. The property of the ink may be varied in a number of ways including, for example, adjusting a concentration of an additive of the ink, adjusting a concentration of microspheres in the ink, adjusting a response of the ink to exposure to a predetermined wavelength of light, adjusting a response of the ink to a change in ambient temperature, or adjusting a response of the ink to being touched (e.g., by a finger of a person). After adjusting the property of the ink, the ink may be used to print the ACI 204 on the cashier's check.

The determination of the ACI 204—including determining a placement of the ACI 204 on the cashier's check, determining design of the ACI 204, and/or a variation in a property of the ink used to print the ACI 204—may be based on a particular instance of the variable protocol used for specifying such property and/or features of the ACI 204. Each instance of the variable protocol may vary based on any number of factors (e.g., inputs) as described herein—such as information related to the cashier's check, the customer, location, time, etc.—to result in an ACI 204 that varies temporally (e.g., hourly, daily, or over any period of time).

A recipient of the cashier's check (e.g., a payee designated on the cashier's check) may provide the cashier's check to a bank to cash or deposit the check. The payee's bank may vary from the payor's bank. The payee's bank may validate the ACI 204. As an example, the payee bank may determine that the ACI 204 is expected to exhibit a certain property or characteristic when exposed to a predetermined wavelength of light. The expected property may be a change in color or may be a revealing of a particular previously imperceptible design within the ACI 204. The predetermined wavelength may be any wavelength of light or range of wavelengths.

As an example, a particular wavelength of ultraviolet light may be applied to the ACI 204. If the ink of the ACI 204 does not change color to a predetermined color in response to exposure to the predetermined wavelength of light, for example, the ACI 204 may be declared to be invalid. In various embodiments, the ACI 204 may show "VOID" until properly developed. The resulting ACI 204 (e.g., the developed ACI 204 and/or a property or feature thereof) may be compared to the expected ACI 204 to verify authenticity. The payee bank may perform such comparison or the payor bank may perform such comparison. Under either scenario, a determination is made if an expected property of the ink and/or a response of the ink matches an expected property or response of the ink, based on the manner of authentication (e.g., manner of developing the ACI 204).

In general, any property or feature of the ACI 204 as described herein may be varied, changed, or adjusted across one or more documents associated with the ACI 204 (e.g., the document 204). The expected property or feature of the ACI 204 may be provided to an entity interested in verifying the ACI 204. In various embodiments, a manner for developing the ACI 204 may be shared with the entity. In various embodiments, the manner for developing the ACI 204 may be known to the entity. In various embodiments, the developed ACI 204 may be provided to the entity that generated the ACI 204 for review and authentication (e.g., for comparison to an expected developed ACI 204). In various embodiments, the entity performing the development of the ACI 204 may be aware of expected characteristics of the developed ACI 204 and may perform any comparison to an actual developed ACI 204. A validated ACI 204 may indicate that an associated document to which it is affixed (e.g., the document 202) is valid and/or otherwise trustworthy. An ACI 204 that is determined to be invalid may indicate that the document 202 is inauthentic and/or fraudulent.

Figure 3:
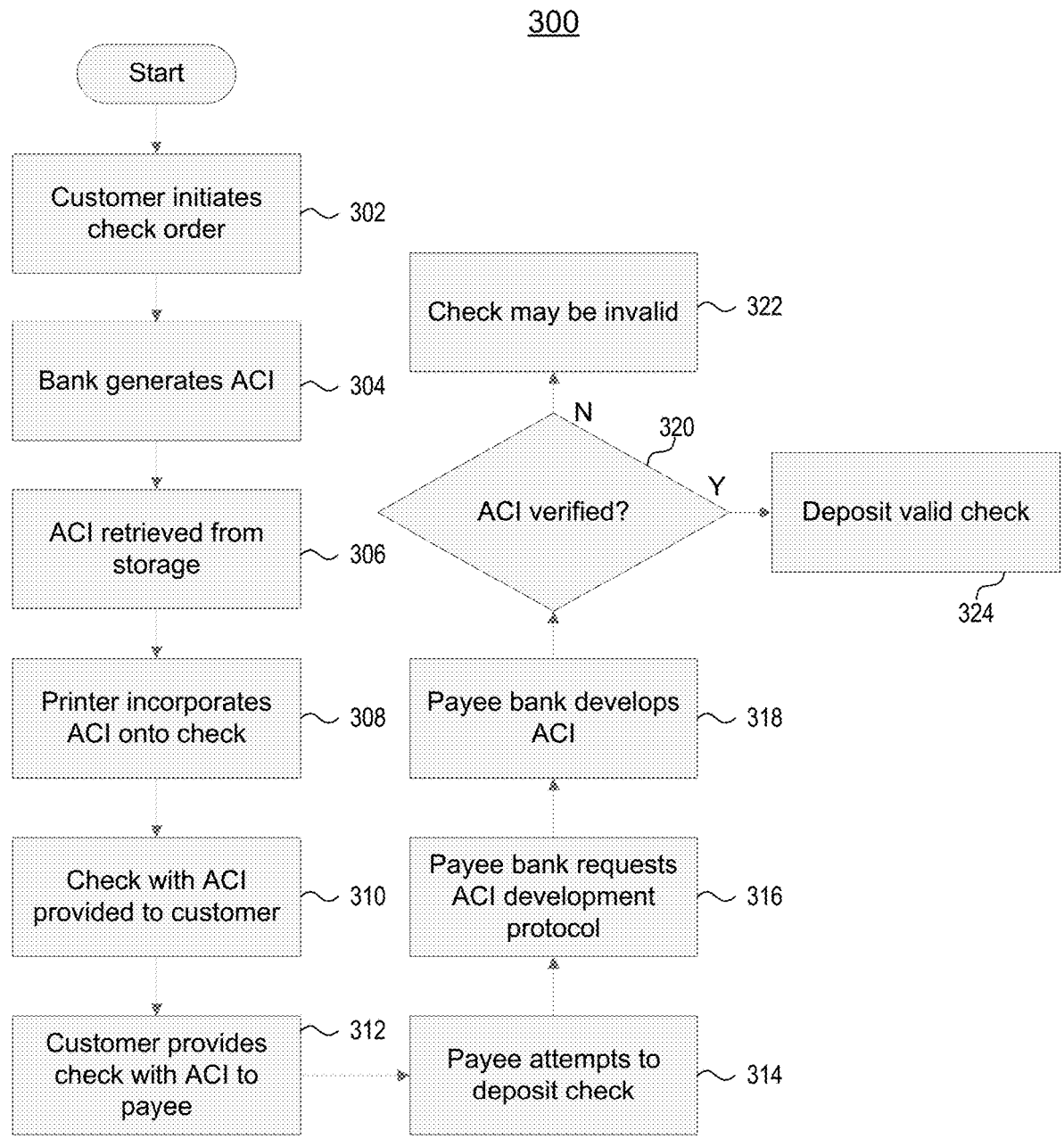
FIG. 3 depicts a flow chart for a method of determining a validity of a document based on an ACI incorporated onto the document.

Determining the ACI 204 based on a variable protocol that may use any number of inputs or factors to vary the ACI 204 (e.g., any property or feature related to the ACI 204) enables the ACI 204 to be varied at any time and/or varied based on a variety of factors. Temporal variation of the ACI 204 mitigates fraudulent ACIs by staying out ahead of fraudulent ACIs. That is, a first ACI may be generated on a first day and a second, different ACI may be generated on a second, sequential day. Because the ACIs vary, a copied or fraudulent version of the first ACI may be easier to detect—for example, as an "old" version of the ACI. Overall, the ACI 204 may be used by a recipient of the document 202 to validate and/or to authenticate the document 202. The recipient may perform operations FIG. 3 illustrates an example method 300 for determining a validity of a document in accordance with one or more aspects described herein. Method 300 may be implemented with the example document 202 and the example ACI 204 depicted in FIG. 2. Method 300 may be implemented by any suitable computing system, as described herein. For example, method 300 may be implemented in any suitable computing environment by a computing device and/or combination of computing devices, such as computing devices 101, 105, 107, and 109 of FIG. 1. Method 300 may be implemented in suitable program instructions, such as in software 127, and may operate on data, such as data 129. Method 300 is described in the context of validating a cashier's check but is not so limited. Instead, method 300 is applicable to any type of document or instrument.

At 302, a customer may request a cashier's check. The customer may request the cashier's check from a bank or other financial institution. The customer may have an account with the bank. The bank that receives the request for the cashier's check may be considered to be the payor's bank. The customer may provide information associated with the requested cashier's check such as, for example, an amount of the cashier's check or a payee of the cashier's check. The bank may receive the request for the cashier's check at step 302.

At 304, the bank may determine an ACI for the cashier's check. The bank may determine the ACI by generating (e.g., electronically) the ACI. The ACI may be an image stored electronically in one or more computing devices. The bank may determine the ACI by determining a shape, a size, a design, a placement, a property, and/or a feature of the ACI, including any property or feature of an ink to be used to print the ACI. The bank may determine the ACI based on a variety of inputs including data or information related to the customer or related to the requested cashier's check. The determined ACI may be stored electronically.

An instance of a variable protocol may be used to determine the ACI with one or more inputs determining the instance of the variable protocol. The instance of the variable protocol may determine any aspect of the ACI including how to develop the ACI. As an example, the instance of the variable protocol may specify how to adjust a property or characteristic of an ink to be used to print the ACI. The instance of the protocol may specify a particular wavelength of light to expose the ACI to in order to detect a property or characteristic of the ACI. The instance of the variable protocol may specify an expected property or feature of the ACI (or the ink) to be used for comparison when developing the ACI.

An example of a method for generating the ACI is further discussed below with respect to FIG. 5. An example of a method for developing and/or validating a document with an ACI is further discussed below with respect to FIG. 6.

At 306, the cashier's check may be ready to be printed. The bank may retrieve the ACI from storage (e.g., a memory or other electronic storage device) and/or a computing device (e.g., a server).

At 308, a printer may be used to print the ACI on the cashier's check. The print may use an ink that has had one or more properties or features adjusted in accordance with the instance of the variable protocol. For example, the printer may use an ink that includes a first concentration of an additive that causes the print ACI to respond in a first manner when exposed to light of a first wavelength. This response may be considered to be an expected property or feature of the ACI. The printer may incorporate the ACI onto the cashier's check at a position or placement determined at step 304.

At 310, the cashier's check that includes the printed ACI may be provided to the customer. Accordingly, the customer may receive a tangible copy of a document incorporating the ACI.

At 312, the customer may provide the cashier's check that includes the printed ACI to a payee.

At 314, the payee may request to deposit the cashier's check. The payee may provide the cashier's check to a bank other than the bank that issued the cashier's check. The bank that receives the cashier's check from the payee may be considered to be the payee's bank. The payee may have an account with the bank that receives the cashier's check from the payee.

At 316, the payee's bank may request information regarding the ACI from the payor's bank. Any information regarding the ACI may be requested. In various embodiments, information related to the instance of the variable protocol used by the payor's bank to determine the ACI may be requested and provided. In various embodiments, the instance of the variable protocol used by the payor's bank to determine the ACI may be requested and provided.

In various embodiments, information related to developing the ACI may be requested and shared. The information related to developing the ACI may be considered to be a development protocol or an ACI development protocol. The ACI development protocol may include any information related to determining or detecting a property, feature, or characteristic of the ACI. As an example, the ACI development protocol may indicate a particular wavelength of light to expose to the ACI. As another example, the ACI development protocol may indicate a manner for decoding encoded information contained in the ACI.

In various embodiments, at step 316, information regarding an expected property or feature of the ACI may be requested and shared. As an example, information regarding a response of the ACI to exposure to the particular wavelength of light may be provided. In various embodiments, the payee's bank may be aware of the ACI development protocol and may not request such information at step 316.

At step 318, the payee's bank may develop the ACI. The payee's bank may develop the ACI based on the ACI development protocol. As described herein, the payee's bank may be aware of the ACI development protocol or may not be aware of the ACI development protocol and may request the ACI development protocol from the payor's bank. Development of the ACI may include any process, procedure, or activity to determine or detect any property, feature, or characteristic of the ACI printed on the cashier's check including any property, feature, or characteristic of the ink used to print the ACI. As an example, the ACI may be developed by exposing the ACI to light of a particular wavelength and detecting the response of the ACI. The response of the ACI may be any response such as revealing a previously invisible image and/or changing a color.

At 320, the developed ACI may be verified for correctness. In various embodiments, a detected property or feature of the ACI determined at step 318 may be compared to an expected property or feature of the ACI. In various embodiments, the comparison may be performed by the payor's bank, for example, by having the payee's bank provide the detected property or feature of the developed ACI to the payor's bank. In various embodiments, the comparison may be made by the payee's bank, for example, by having the payor's bank provide any expected property or feature of the ACI to the payee's bank. In various embodiments, the comparison may be a visual comparison (e.g., of a developed ACI to an expected developed ACI). In various embodiments, the ACI may be machine readable and the developed ACI may be compared to an expected ACI by a computing device. For example, the ACI may be a QR code and a computing device may compare the expected QR code to the actual QR code after development of the ACI.

At 322, if the developed ACI does not matched the expected ACI (e.g., a property or feature of the developed ACI does not match an expected property or feature of the ACI), then the document associated with the ACI may be determined to be inauthentic and/or invalid. An investigation may be triggered based on the determination that the ACI is inauthentic or not valid.

At 324, if the developed ACI does match the expected ACI (e.g., a property or feature of the developed ACI does match an expected property or feature of the ACI), then the document associated with the ACI may be determined to be authentic and/or valid. The payee's bank may then proceed with processing the check. As an example, the payee's bank may complete a requested deposit of the cashier's check.

Figure 4:
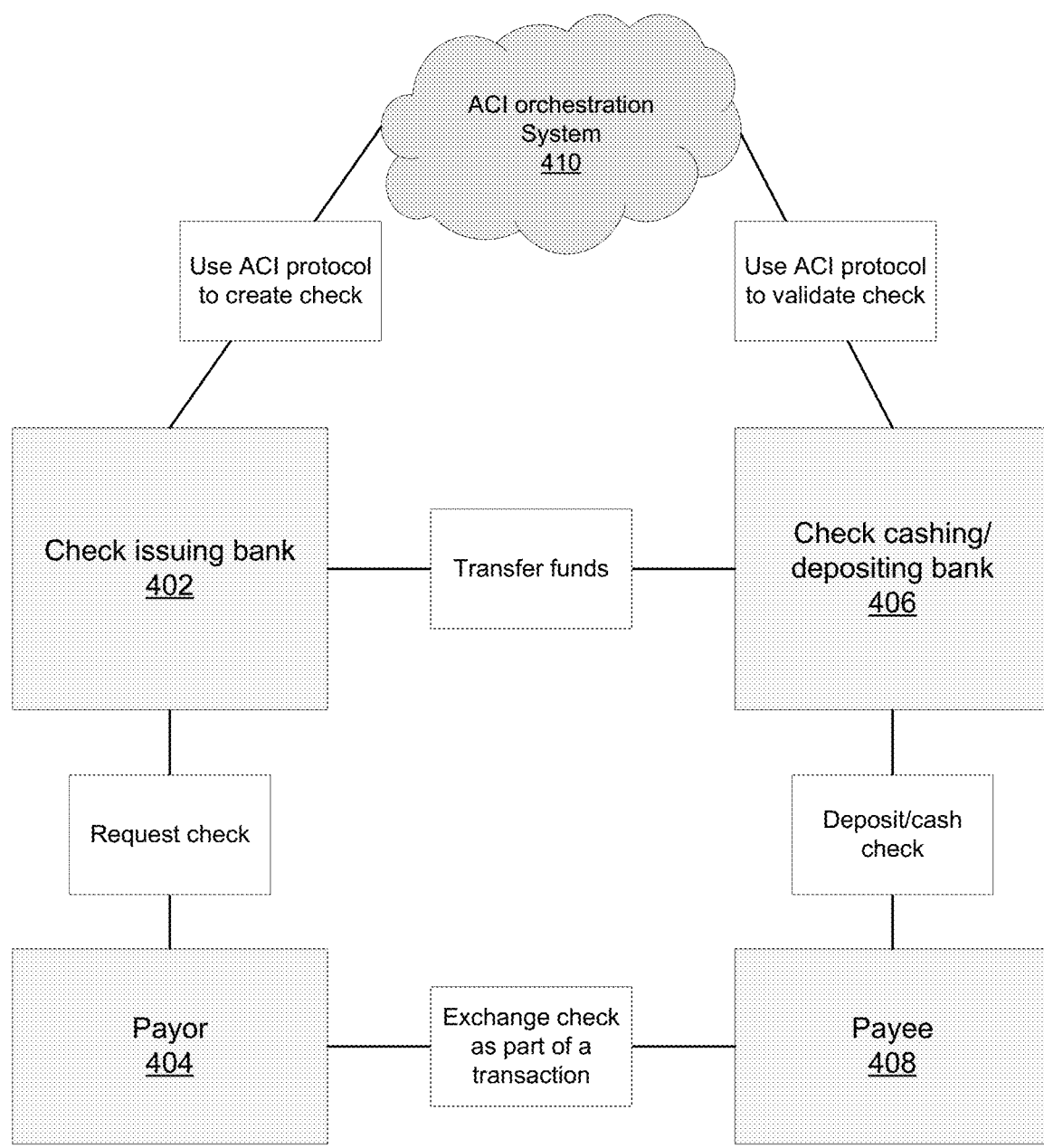
FIG. 4 depicts a system architecture for determining a validity of a document in accordance with one or more aspects described herein.

FIG. 4 illustrates a system architecture 400 for determining a validity of a document in accordance with one or more aspects described herein. The system architecture 400 may be used to implement the method 300 or a portion thereof. The system architecture 400 may be used to generate one or more of the document 200 and the ACI 204 depicted in FIG. 2. The system architecture 400 may include any computing device and/or combination of computing devices, such as computing devices 101, 105, 107, and 109 of FIG. 1. The system architecture 400 is described in the context of entities associated with issuance and processing a cashier's check (e.g., an issuing bank and a cashing bank) but is not so limited. Instead, the system architecture 400 is applicable to any type of entity or actor and any type of document or instrument.

As shown in FIG. 4, the system architecture 400 may include a check (e.g., a cashier's check) issuing bank 402, a check payor 404, a processing bank (e.g., a check cashing or check depositing bank) 406, and a check payee 408. The system architecture 400 may further include an ACI orchestration system 410.

The check payor 404 may request a cashier's check from the issuing bank 402. To generate the cashier's check, the issuing bank 402 may receive information related to a protocol for generating an ACI from the ACI orchestration system 410. The ACI orchestration system 410 may provide the issuing bank 402 with information for generating the ACI including, for example, information related to an instance of a variable protocol for generating the ACI as described herein.

The issuing bank 402 may create the cashier's check and may include an ACI on the cashier's check in accordance with and/or based on information received from the ACI orchestration system 410. The issuing bank 402 may provide the cashier's check to the check payor 404.

The check payor 404 may provide the cashier's check to the check payee 408. The check payor 404 may provide the cashier's check to the check payee 408 as part of a transaction. The check payee 408 may provide the cashier's check to the processing bank 406. The check payee 408 may provide the cashier's check to the processing bank 406, for example, to request cashing or deposit of the cashier's check.

The processing bank 406 may attempt to validate the cashier's check by validating the ACI included on the cashier's check. The processing bank 406 may receive information from the ACI orchestration system 410 to validate the ACI. The processing bank 406 may receive information regarding a protocol for developing the ACI as described herein. The processing bank may receive information regarding an expected property or feature of the ACI and/or the developed ACI.

Any combination of the processing bank 406, the ACI orchestration system 410, and the issuing bank 402 may be used to develop the ACI, compare the ACI and/or the developed ACI to an expectation of the ACI and/or the developed ACI, and determine if the ACI is valid or invalid. The results of any of these determinations may be communicated to one or more of the processing bank 406, the ACI orchestration system 410, and the issuing bank 402.

When it is determined that the ACI on the cashier's check is valid, it may be determined that the cashier's check is valid. Accordingly, the processing bank 406 may allow the payee 408 to deposit the cashier's check. Funds from the issuing bank 402 may then be transferred to the processing bank 406.

Figure 5:
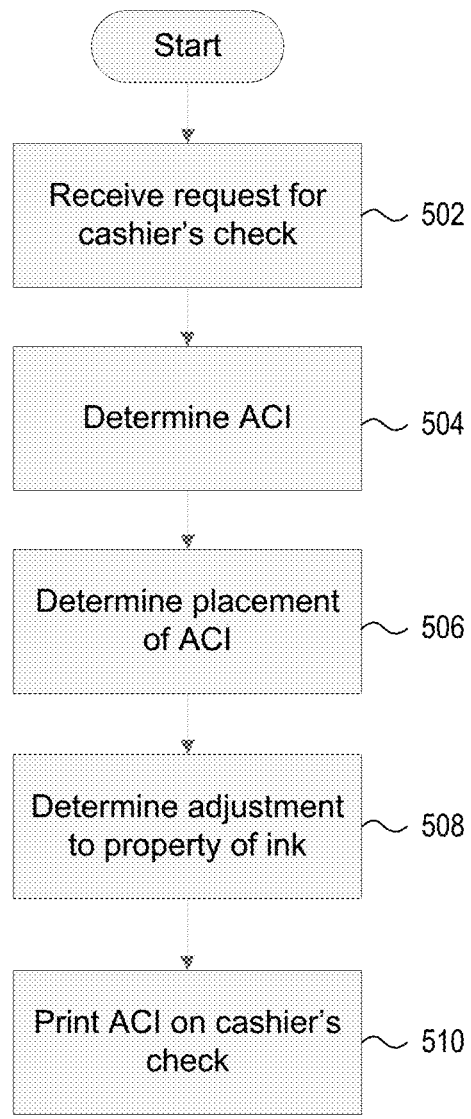
FIG. 5 depicts a flow chart for a method of generating an ACI for a document.

FIG. 5 illustrates an example method 500 for generating an ACI in accordance with one or more aspects described herein. Method 500 may be implemented with the example document 202 and the example ACI 204 depicted in FIG. 2. Method 500 may be implemented by any suitable computing system, as described herein. For example, method 500 may be implemented in any suitable computing environment by a computing device and/or combination of computing devices, such as computing devices 101, 105, 107, and 109 of FIG. 1. Method 500 may be implemented in suitable program instructions, such as in software 127, and may operate on data, such as data 129. Method 500 may be implemented within the system architecture 400. Method 500 is described in the context of generating an ACI for a cashier's check but is not so limited. Instead, method 500 is applicable to any type of document or instrument. Method 500 may be part of the method 300 described above.

At step 502, a request from a customer for a cashier's check may be received. The request may be received electronically.

At step 504, an ACI for the cashier's check may be determined. The ACI may comprise an image for validating the cashier's check. The ACI may be generated based on the customer and/or information associated with the cashier's check.

At step 506, a placement of the ACI on the cashier's check may be determined. The ACI may be placed anywhere on the cashier's check.

At step 508, an adjustment to a property of an ink for printing the ACI may be determined and/or an adjustment to the property of the ink for printing the ACI may be determined. The adjustment to the property of the ink may be any of the adjustments discussed herein in relation to a property of the ink.

At step 510, the ACI may be printed on the cashier's check. The ACI may be printed on the cashier's check using the ink determined in step 508 and/or based on the ACI placement determined at step 506. The cashier's check may be provided to the customer.

Figure 6:
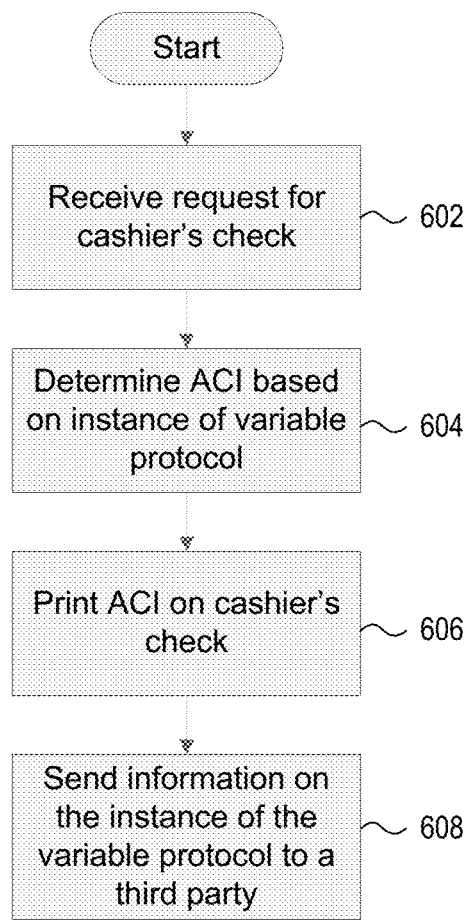
FIG. 6 depicts a flow chart for a method of using an ACI to validate a document.

FIG. 6 illustrates an example method 600 for using an ACI to validate a document in accordance with one or more aspects described herein. Method 600 may be implemented with the example document 202 and the example ACI 204 depicted in FIG. 2. Method 600 may be implemented by any suitable computing system, as described herein. For example, method 600 may be implemented in any suitable computing environment by a computing device and/or combination of computing devices, such as computing devices 101, 105, 107, and 109 of FIG. 1. Method 600 may be implemented in suitable program instructions, such as in software 127, and may operate on data, such as data 129. Method 600 may be implemented within the system architecture 400. Method 600 is described in the context of a cashier's check but is not so limited. Instead, method 600 is applicable to any type of document or instrument. Method 600 may be part of the method 300 described above.

At step 602, a request for a cashier's check may be received. The request may be received electronically.

At step 604, an ACI for the cashier's check may be determined. The ACI may be determined based on an instance of a variable protocol for generating ACIs as described herein. The ACI may comprise an image for validating the cashier's check.

At step 606, the ACI may be printed on the cashier's check. The ACI may printed on any portion of the cashier's check.

At step 608, information based on the instance of the variable protocol may be sent to a third party. The information sent to the third party may be used to develop the ACI on the cashier's check as described herein. The information sent to the third part may also be used or may alternatively be used to validate the cashier's check.

Some aspects described herein may provide benefits for determining an authenticity of a document in a more reliable and accurate manner In contrast to prior techniques that rely on a predetermined and/or a static image incorporated onto a document as an indicator of a validity of the document, aspects described herein provide for the ACI to be provided with issuance of the document. Accordingly, the ACI—for example, any property, feature, or characteristic of the ACI—may be adjusted and varied at any time based on a variety of inputs or factors, thereby reducing opportunities for copying. Further, techniques for detecting any adjusted feature of the ACI may be secured, thereby preventing an interceptor from determining how to validate the ACI and therefore the document. Providing the ACI at a time of issuance of the document to be secured obviates any need for expensive pre-printed paper stocks that incorporate static, predetermined means for validating a document.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
receiving a request from a customer for a cashier's check;
determining an authorization code image (ACI) for the cashier's check, wherein the ACI comprises an image for validating the cashier's check, the ACI generated based on the customer and information associated with the cashier's check;
determining a size, a shape, and a placement of the ACI on the cashier's check;
adjusting a property of an ink for printing the ACI;
printing, based on the determined size and the determined shape, the ACI on the cashier's check with the ink and on the determined placement; and
providing an indication of the adjusted property of the ink to a validator of the cashier's check, wherein the determined size, the determined shape, and the determined placement of the ACI are based on a date and a time of day the request from the customer for the cashier's check is received and a recipient of the cashier's check.

2. The method of claim 1, wherein adjusting the property of the ink comprises adjusting a concentration of an additive of the ink.

3. The method of claim 1, wherein adjusting the property of the ink comprises making an adjustment to the ink for affecting a response of the ink to a predetermined wavelength of light.

4. The method of claim 1, wherein adjusting the property of the ink comprises making an adjustment to the ink for affecting a response of the ink to a change in temperature.

5. The method of claim 1, wherein adjusting the property of the ink comprises making an adjustment to the ink for affecting a response of the ink to a human touch.

6. The method of claim 1, wherein determining the ACI is further based on a date, a time, or both a date and a time.

7. The method of claim 1, wherein determining the placement of the ACI on the cashier's check is based on a location of issuance of the cashier's check.

8. The method of claim 1, wherein the image for validating the cashier's check comprises a quick response (QR) code.

9. The method of claim 1, wherein the ACI is unique to the cashier's check.

10. A computer-implemented method comprising:
receiving a request for a cashier's check;
determining an authorization code image (ACI) for the cashier's check based on an instance of a variable protocol for generating ACIs, wherein the ACI comprises an image for validating the cashier's check;
determining, based on the instance of the variable protocol for generating ACIs, a size, a shape, and a placement of the ACI on the cashier's check;
printing, based on the determined size and the determined shape, the ACI on the cashier's check on the determined placement; and
sending information based on the instance of the variable protocol, wherein the information can be used by a third party to (a) develop the ACI on the cashier's check, (b) validate the cashier's check, or both (a) and (b), wherein the determined size, the determined shape, and the determined placement of the ACI are based on a date and a time of day the request from the customer for the cashier's check is received and a recipient of the cashier's check.

11. The method of claim 10, wherein the ACI is machine readable.

12. The method of claim 10, wherein the information based on the instance of the variable protocol includes the instance of the variable protocol.

13. The method of claim 10, wherein the instance of the variable protocol for the ACI includes a temperature sensitivity characteristic of an ink used for printing the ACI.

14. The method of claim 10, wherein the instance of the variable protocol for the ACI includes a light sensitivity characteristic of an ink used for printing the ACI.

15. The method of claim 10, wherein the instance of the variable protocol for the ACI includes a concentration of an additive of an ink used for printing the ACI.

16. The method of claim 10, wherein the instance of the variable protocol for the ACI is determined based on a date, a time, or both the date and the time.

17. The method of claim 10, wherein the instance of the variable protocol for the ACI is determined based on the customer, a location, or both the customer and the location.

18. One or more non-transitory media storing instructions that, when executed by one or more processors, cause the one or more processors to perform steps comprising:
receiving a request from a customer for a cashier's check;
determining a date the request was received;
determining a time of day the request was received;
determining a recipient of the cashier's check;
determining a location associated with the request;
determining information associated with the customer;
determining an authorization code image (ACI) for the cashier's check and a size, a shape, and a placement of the ACI on the cashier's check, based on the determined date, the determined time of day, the determined recipient, the determined location, and the determined information associated with the customer, wherein the ACI comprises an image for validating the cashier's check;
printing, based on the determined size and the determined shape, the ACI on the cashier's check on the determined placement; and
providing information regarding the ACI to a validator of the cashier's check.

* * * * *